Feb. 18, 1969 R. S. TRACHTENBERG ET AL 3,428,284
ELECTRIC OUTLET BOX MOUNTING
Filed Dec. 4, 1967
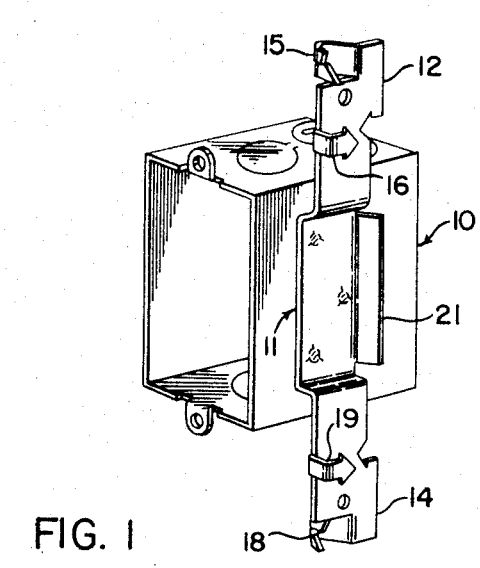
FIG. 1
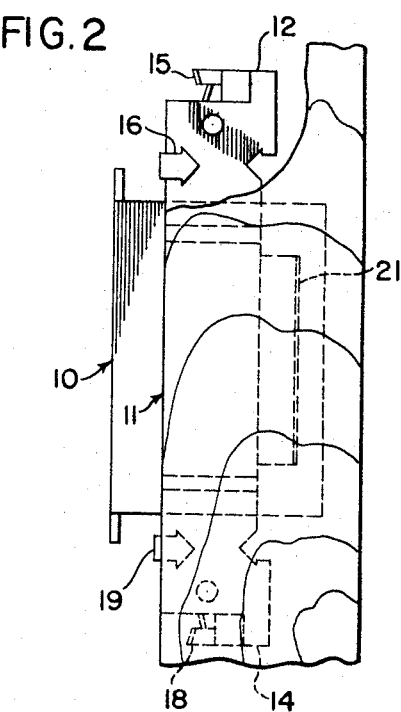
FIG. 2
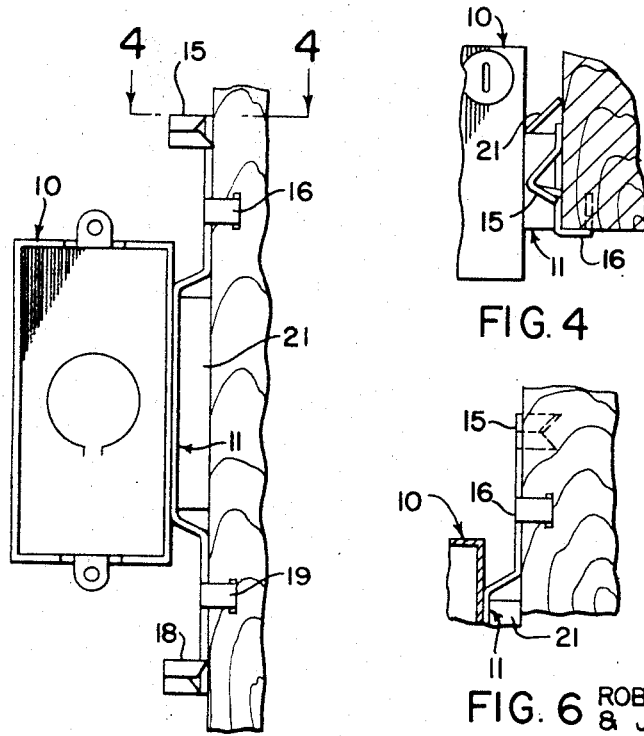
FIG. 3
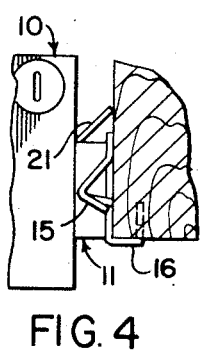
FIG. 4
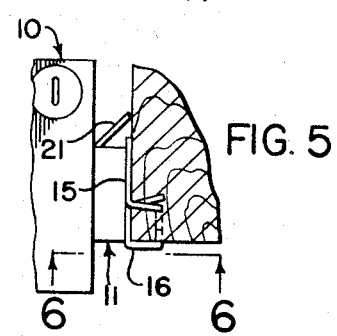
FIG. 5
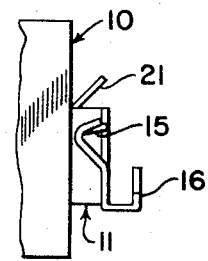
FIG. 6
FIG. 7
INVENTORS.
ROBERT SHERMAN TRACHTENBERG
& JULIUS EARL KREUZER
BY
Thomas S. Mayner
ATTORNEY

United States Patent Office 3,428,284
Patented Feb. 18, 1969

3,428,284
ELECTRIC OUTLET BOX MOUNTING
Robert S. Trachtenberg, Pittsburgh, and Julius Earl Kreuzer, Sewickley, Pa., assignors to Midland-Ross Corporation, Cleveland, Ohio, a corporation of Ohio
Filed Dec. 4, 1967, Ser. No. 687,880
U.S. Cl. 248—216       3 Claims
Int. Cl. H02g 3/08

ABSTRACT OF THE DISCLOSURE

Where an electric outlet box is mounted on a stud corner it is provided with an angular support that provides spacing for subsequent wall facing and a hammerable grasping means about a corner of the stud.

---

This invention relates to an improved stud corner mounting for an electric outlet box securable to a stud or joist. The mounting, forming a part of the box, also spaces the box permitting room for subsequent wall finishing.

The outlet box mounting of this invention does not need additional securing means such as nails or screws since the formed holding means are adapted to be hammered into the support quickly and easily. Advantageously, the mounting is stamped out of metal as a unit including an offset and the stud seizing spurs for stud front and side driving. The box mounting is formed to provide at least a three point positioning contact with the stud to insure stability while being secured to the stud.

More specifically, the box mounting bracket center portion is indentured or set back along the side of the box to a predetermined depth from the box face a distance estimated to equal that of about the thickness of a subsequent finished wall, and its flat extensions are provided with the stud seizing or embedding prongs at about 90° positions. The prongs also are spaced apart so that when they are hammered into a wooden stud they are at different points to effect excellent gripping and very little chance of damaging the stud itself. The stud seizing prongs hold the box in a proper and sturdy position, one that is not removable without damaging the stud itself. These and other advantages of the outlet box mounting will be further described in detail in the following specification and drawing, where:

FIGURE 1 is a perspective view of the outlet box with the mounting of this invention;

FIGURE 2 is a side view, partly in section, of the box being mounted about a stud corner;

FIGURE 3 is a frontal view of the box showing the raised position and the 90° relation of the stud seizing prongs at the moment prior to nailing;

FIGURE 4 is a vertical sectional view of FIGURE 3 taken across line 4—4 of FIGURE 3 with the side prongs nailed in;

FIGURE 5 is a further showing of the section of FIGURE 4 with both front and side prongs being driven in;

FIGURE 6 is a frontal sectional view of FIGURE 3 showing both prongs driven; and FIGURE 7 represents a modification of FIGURE 4 showing the stud side embedding prongs on the opposite side to the stud facing prongs.

Referring to the drawing, an electrical outlet box 10 that is to be quickly secured to a stud corner is shown with an economical and quickly used mounting bracket 11 which also provides spacing for subsequent wall finishing work. The mounting bracket 11 is attached to the box 10 by means of spot welding, a rapid method of securing two pieces of steel to each other. As shown, the bracket 11 is longer than the outlet box 10 having offset upper and lower extensions 12, 14 of about equal length; each extension, however, being long enough to permit an unhampered use of a hammer on the prongs at about the ends. Each section 12, 14 is offset because the standard box construction (not shown) is of three pieces, the central section and two sides. The sides are secured to the central section by interconnecting lugs and offset screws. The offset of the extensions thus clears the box lugs and screws.

The vertical or upper section 12 of mounting bracket 11 carries integral prongs 15, 16 while the lower section 14 carries similar prongs 18, 19. Along the central portion of the bracket 11 and generally laterally coextensive with the mounting 11 base is a side member 21 angularly raised a distance from the base portion equal to the offset of extensions 12, 14, the three providing a firm base on a stud.

The main or spot welded section of the mounting bracket 11 is set back along the box wall 10 a distance from the face of the box so as to provide clearance for subsequent front wall work and this spacing is assured by the struck-out prongs on the longitudinal extensions 12, 14 when hammered in. The height or offset of the mounting extensions 12, 14 and that of the angularly positioned member 21 are all equal and thus provide for a level three point support of the outlet box 10. The 90° positioning of the stud embedding prongs 15, 18 and 16, 19 further provide for the corner mounting of a stud or joist.

As stated, the upper and lower members 12, 14 of the mounting bracket 11 are provided with wood embedding prongs 15, 16 and 18, 19 respectively. The prongs have been formed out of the same metal piece forming the entire mounting bracket. The opposite prongs 16, 19 are, of course, similar in form and position, their embedding ends of points being turned about 180° to the base while the second set of prongs are bent about 90° to the base. The prongs 16, 19 are shown as having arrowhead points. This construction is advantageous in that, upon being hammered flush into the wood, the wood behind the heads tends to flow back into the space made by them to further increase their hold on the stud. The second series of prongs 15, 18 are desirably split and are angularly pointed, the points being oppositely angulated however. As these points are hammered into the stud side, the divergent angulation of each forces them to slightly separate, this splitting further improving the overall grip of the mounting bracket onto the stud.

FIGURE 3 shows the mounting bracket 11 as initially placed along the edge of the stud, the outgoing upper and lower supporting sections 12, 14 and the angulated side member 21 and the prongs 16, 19 meet and rest on and about the stud edge. In mounting, the prongs 16, 19 are first hammered into the stud face and then the second set of the angularly raised prongs 15, 18. The final position is shown in FIGURE 2. Upon being hammered into position the prongs will appear as in FIGURES 4, 5 and 6 effecting a clinching hold on the stud corner that is generally impossible to loosen without possible destruction of the stud member.

As described it should be apparent that the mounting permits very quick installation with its almost automatic positioning about a stud corner and with but a few necessary hammer blows to secure it. The positioning of each set of prongs at either end of the outward sections 12, 14 can be altered somewhat, the prongs 15 and 18 could be formed on the opposite side to the prongs 16, 19 as shown in the modification of FIGURE 7. These prongs can be stamped out of the other side of the sections 12, 14 to enclose more wood between them, however, it has been found that the initially described construction provides sufficient support on the outlet box.

What is claimed is:

1. A nailing mounting bracket for an electrical box about a corner of a wood support comprising, a box, a central generally rectangular section of said mounting secured to a side of the box and having a substantially coextensive side member extending angularly outwardly a predetermined distance, offsetting longitudinally extending end members forming a part of said central section having a width about equal to the said central section being offset the same distance as the angularly extending member, the end members and the angular side member serving as base supporting points of said box on a wood support, and nailing prongs on each of said extended end members positioned at about 90° to each other adapted to be hammered into the side and face of the wood support.

2. The mounting bracket of claim 1 where one set of the prongs is split and the pointed ends thereof are in apposition.

3. The mounting bracket of claim 1 where one set of the prongs is split and the second is singular and pointed.

References Cited

UNITED STATES PATENTS

| | | | |
|---|---|---|---|
| 2,299,674 | 10/1942 | Austin | 248—311 |
| 2,328,421 | 8/1943 | Carlson et al. | 248—300 |
| 2,406,587 | 8/1946 | Cooper | 220—3.9 |
| 2,973,175 | 2/1961 | Appleton | 248—216 |
| 3,104,087 | 9/1963 | Budnick et al. | 248—216 XR |

JOHN PETO, *Primary Examiner.*

U.S. Cl. X.R.

220—3.9; 248—300